May 3, 1966 L. L. GENUIT 3,249,806
PHASE CONTROL CIRCUITS AND SYSTEMS FOR CONTROLLING
POWER TO ELECTRIC DISCHARGE LAMPS
Filed May 1, 1963 3 Sheets-Sheet 2
FIG_2
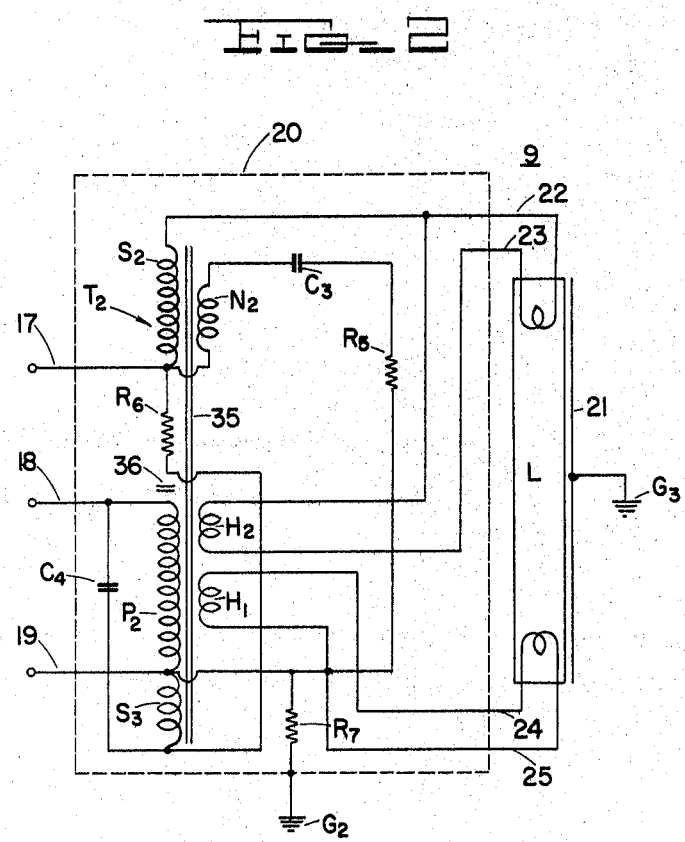
FIG_5
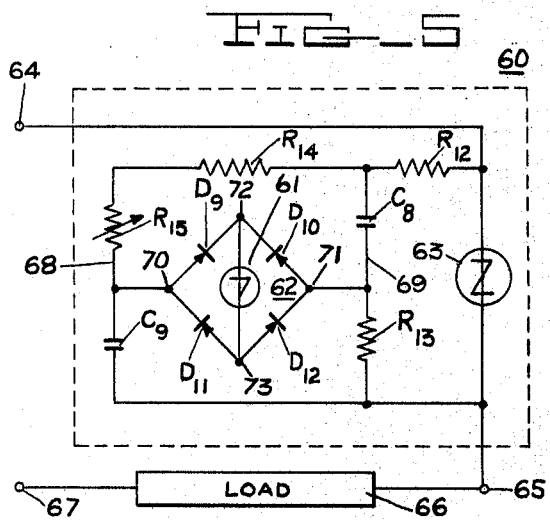
INVENTOR.
Luther L. Genuit,
BY Henry J. Moinarh
Attorney.

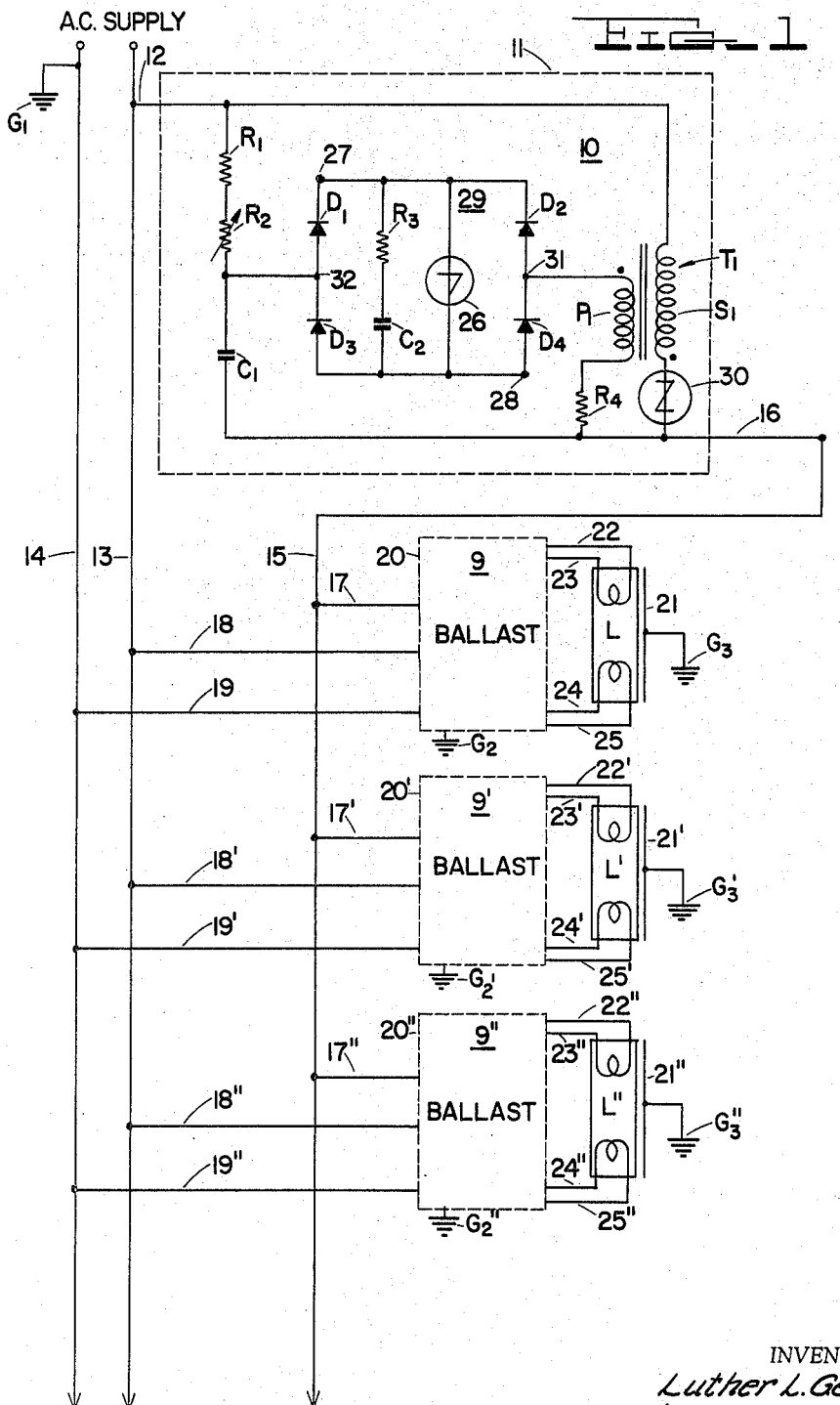

May 3, 1966   L. L. GENUIT   3,249,806
PHASE CONTROL CIRCUITS AND SYSTEMS FOR CONTROLLING
POWER TO ELECTRIC DISCHARGE LAMPS
Filed May 1, 1963   3 Sheets-Sheet 3

INVENTOR.
Luther L. Genuit,
BY *Henry J. Mainiak*
Attorney.

United States Patent Office 3,249,806
Patented May 3, 1966

3,249,806
PHASE CONTROL CIRCUITS AND SYSTEMS FOR CONTROLLING POWER TO ELECTRIC DISCHARGE LAMPS
Luther L. Genuit, Danville, Ill., assignor to General Electric Company, a corporation of New York
Filed May 1, 1963, Ser. No. 277,349
13 Claims. (Cl. 315—194)

This invention relates to phase control circuits and systems for controlling the power supplied to a load. More particularly, it relates to such phase control circuits and systems adapted for dimming electric discharge lamps, such as fluorescent lamps, by controlling the volt-time integral of the voltage supplied to the lamp.

The operation of fluorescent lamps at low intensity levels has presented difficulties in the past. The negative resistance characteristic of a fluorescent lamp changes to a positive resistance characteristic as the lamp current decreases below a certain level. Further as the current supplied to the lamp decreases, the temperature of the bulb wall decreases and the gas pressure within the lamp also changes. These factors, among others, may cause the fluorescent lamp to flicker at low illumination levels and limit the minimum level of light intensity at which a fluorescent lamp can be operated with a satisfactory degree of stability.

Semiconductor switching devices, such as silicon controlled rectifiers, have been used to vary the average power supplied to a fluorescent lamp in order to operate the lamp at various light intensity or dimming levels. The average power supplied to the lamp is controlled by varying the volt-time integral of the lamp voltage by firing the switching device in each half cycle or alternate half cycle of the power supply. Although switching devices such as silicon controlled rectifiers have been successfully employed in phase control circuits and fluorescent lamp dimming systems, such circuits require rather complex and relatively expensive switching networks.

Where semiconductor switching devices are used in phase control systems, the phase angle at which the device is fired in each half cycle determines the interval of current conduction to the lamp load. For stable lamp operation, it is required that the switching device or devices be fired symmetrically in each half cycle. Bilateral switching devices, such as five layer diodes, are particularly adaptable to phase control circuits since they can be switched from a high impedance state into a low impedance state by the application of a terminal voltage in excess of the switching voltage. The voltage required for switching a five layer diode in one direction is approximately the same as the voltage required for the switching in the reverse direction. However, one of the difficulties encountered in employing these devices in phase control circuits for dimming fluorescent lamps is that symmetrical firing has not been readily accomplished in practice with relatively simple switching networks and with commercially available components.

Five layer diodes have been used as bilateral switching devices in phase control systems for dimming lamps where symmetrical firing is not a critical requirement. Such phase control systems, however, have not proven practicable for dimming fluorescent lamps. When the switching device is not fired symmetrically in a phase control system for dimming fluorescent lamps, the lack of the symmetry in the firing angle of the switching device will cause the fluorescent lamp to flicker.

Accordingly, it is a general object of the present invention to provide an improved phase control circuit and system for dimming electric discharge lamps.

A more specific object of the invention is to provide an improved phase control circuit for use in conjunction with ballasts for dimming electric discharge lamps such as fluorescent lamps by controlling the volt-time interval of the lamp voltage.

Another object of the present invention is to provide an improved phase control circuit employing a five layer diode wherein the five layer diode is symmetrically switched from a high impedance state to a low impedance state in each half cycle.

A further object of the invention is to provide a phase control circuit that is adaptable for use in conjunction with dimming ballasts for operating fluorescent lamps at various levels of light output and that can be economically manufactured.

These and other objects and advantages of the invention are achieved in a phase control circuit embodying one form of the invention wherein a semiconductor device, such as a five layer diode, switchable bilaterally between a high impedance and a low impedance condition, is fired symmetrically in each half cycle of an alternating current supply by a firing network which includes a second semiconductor device switchable unilaterally between a high impedance and a low impedance condition. The second semiconductor device, which preferably is a four layer diode, is connected across the D.C. terminals of a bridge rectifier.

In order to control the firing angle of the second semiconductor switching device, an RC circuit which includes a variable resistor and at least one capacitor is connected in circuit across the first semiconductor device so that the RC circuit is energized only when the first semiconductor device is in the high impedance condition. The firing network is coupled with the first semiconductor device by means of a transformer having a primary winding and a secondary winding, the secondary winding being connected in circuit with the first semiconductor device. The primary winding and the bridge rectifier are serially connected across the capacitor of the RC circuit so that the second semiconductor device is fired in each half cycle when the voltage across the D.C. terminals of the bridge rectifier reaches the switching voltage of the second semiconductor device.

When the second semiconductor device is fired, the primary winding of the transformer is excited thereby inducing a firing pulse in the secondary winding to fire the first semiconductor device. With a unilateral switching device connected inside a bridge rectifier it was found that the semiconductor power device was symmetrically fired in each half cycle of the alternating supply. Such phase control circuits were found to be particularly suitable for applications such as fluorescent lamp dimming, where asymmetrical firing of a semiconductor switching device may result in flickering and instability at low illumination levels.

In a preferred form of the invention I have included a second capacitor within the bridge rectifier and in parallel circuit relation with the second semiconductor device. Both the first and second capacitors form a part of the RC circuit and are charged in parallel through the variable resistor means. With one capacitor of the RC circuit connected within the bridge and the other outside of the bridge, it was found that phase control of the power could be more effectively exercised at relatively low power levels.

According to another aspect of the invention, the RC timing circuit is connected entirely within the bridge rectifier. The bridge rectifier and the primary winding of the transformer are serially connected across the secondary winding and the first semiconductor switching device. It was found that this circuit arrangement also provided a satisfactory control at low power levels.

The subject matter which I regard as my invention is set forth in the appended claims. The invention itself, however, together with further objects and advantages thereof may be better understood by referring to the following description taken in connection with the accompanying drawings in which:

FIGURE 1 is a schematic diagram of one form of my invention in which the improved phase control circuit is used in a fluorescent lamp dimming system;

FIGURE 2 is a schematic circuit diagram of a dimming ballast of a type which may be employed in conjunction with a phase control circuit and which is shown in block form in the fluorescent lamp dimming system schematically illustrated in FIGURE 1;

FIGURE 5 is a schematic circuit diagram of a phase control circuit embodying another form of the invention in which the firing network is coupled across the five layer diode power device without a transformer.

Figure 3:
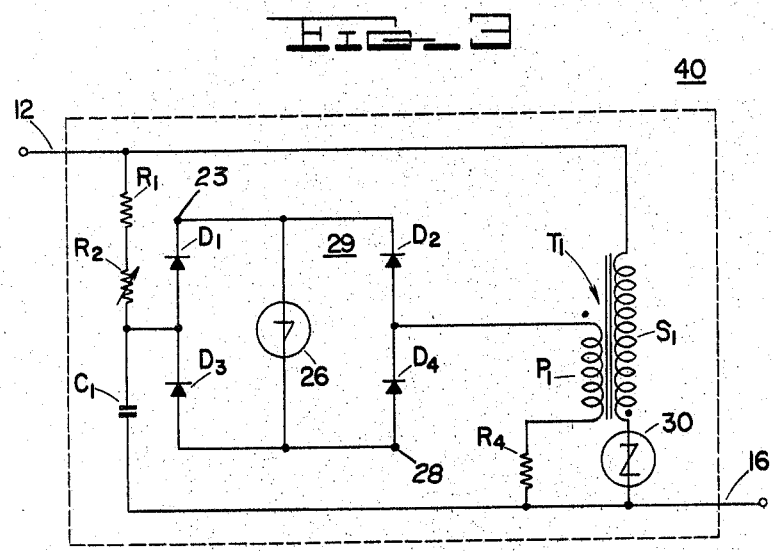
FIGURE 3 is a schematic circuit diagram of a phase control circuit embodying the invention.

Referring now more particularly to FIGURE 1, I have illustrated a phase control circuit embodying one form of the invention in an improved system for operating a plurality of lamps L, L′, L″ having dimming ballasts 9, 9′, 9″ associated therewith. The phase control circuit is generally identified by reference numeral 10 and is shown in a dashed rectangle 11 which represents the housing or encapsulating means for the phase control circuit 10. An input terminal lead 12 is shown connected to the ungrounded or high potential supply line 13 of an alternating current supply. The grounded or low potential supply line 14 is identified by the connection to the ground $G_1$. A switching line 15 is shown connected with a switching terminal lead 16 of the phase control circuit 10 and is provided for connection to the switching leads 17, 17′, 17″ of the dimming ballasts 9, 9′, 9″.

It will be seen that the input leads 18, 18′, 18″, and 19, 19′, 19″ of the ballasts 9, 9′, 9″ are connected to the supply lines 13, 14. The ballast cannisters 20, 20′, 20″ are represented schematically by the dashed rectangles and are connected to grounds $G_2$, $G_2'$, $G_2''$. To insure reliable starting the lamps L, L′, L″ are capacitively coupled to plates or fixtures 21, 21′, 21″ connected to grounds $G_3$, $G_3'$, $G_3''$.

As is shown in FIGURE 1, ballast 9 is connected in circuit with the fluorescent lamp L by means of four leads 22, 23, 24 and 25. The corresponding leads of the other ballasts are identified by the primed and doubled primed reference numerals. It will be appreciated that although three ballasts 9, 9′ and 9″ are shown connected to the supply lines 13, 14 and the switching line 15, that additional ballasts may be connected in the system.

Turning now more particularly to the phase control circuit 10, a four-layer diode 26 is connected across the D.C. terminals 27, 28 of a bridge rectifier 29 comprised of the diodes $D_1$, $D_2$, $D_3$ and $D_4$. The four-layer diode 26 and the bridge rectifier 29 function as a symmetrically bilateral firing network for a five layer diode 30. This firing network includes a pulse transformer $T_1$ having a secondary winding $S_1$ connected in series with the five layer diode 30 and a primary winding $P_1$ connected with one of the A.C. terminals 31 of the bridge rectifier 29. The other A.C. terminal 32 is connected to an RC circuit.

The firing angle of the four layer diode 26 is controlled by the RC circuit which includes capacitors $C_1$, $C_2$ and a variable resistor means comprised of a resistor $R_1$ and a variable resistor $R_2$. The capacitors $C_1$ and $C_2$ are charged in parallel by the current which passes through the resistor $R_1$, the variable resistor $R_2$, lines 16, 15, 17, a resistor $R_6$ and a winding $S_3$ (in the ballast 9 as shown in FIGURE 2), and lines 19, 14. The variable resistor $R_2$ functions as intensity control for the lamps L, L′, L″. A resistor $R_3$ limits the discharge current of the capacitor $C_2$ and similarly, a resistor $R_4$ is provided to limit the discharge current of the capacitor $C_1$ which provides the firing pulse for transformer $T_1$ when the four layer diode 26 is switched to the low impedance condition.

The four layer diodes, which may be used in the practice of the present invention, are PNPN semiconductor switching devices having two terminals. The four layer diode 26 may be constructed from silicon layers formed by controlled diffusion of impurities to provide the alternate P-type and N-type layers. Essentially, the four layer diode is a unidirectional switching device switchable between a high and a low impedance condition. By applying a voltage across the terminals that exceeds the switching voltage, the device is switched into the low impedance or conducting condition and will remain in this condition so long as the current passing through the device exceeds the holding current value. It is switched to the high impedance condition as the discharge current from capacitor $C_1$ and $C_2$ decays to a level below the holding current level of the four layer device.

In the symbol used to identify the four layer diode 26 in the drawings, the slant line indicates the forward direction of current flow through the diode. The symbol used to schematically represent the five layer diode 30 consists of two spaced horizontal lines joined at one end by a slant line, the slant line forming two half arrows indicating the five layer diode 30 is bidirectional. The five layer diode which may be used as a power control device in the phase control circuit 10 is a two-terminal PNPNP semiconductor switching device and is switchable bilaterally between a high impedance condition and a low impedance condition. The five layer diode has a stable high impedance condition and a stable low impedance condition in either direction and may be fired during each alternation of the voltage when the voltage across its terminals exceeds its switching voltage.

During operation the firing network of the phase control circuit 10 is energized only when the five layer diode 30 is in the high impedance or nonconducting condition. Thus, the RC timing circuit comes into play at the end of each half cycle of load current when the five layer diode 30 has been switched to its high impedance condition. Also, during the high impedance condition of the five layer diode the switching leads 17, 17′, 17″ of the ballasts 9, 9′, 9″ and the input leads 18, 18′, 18″ are not connected in a closed circuit because of the high impedance presented by the five layer diode 30. Consequently, there will be no current flow to the lamps L, L′ and L″. When the five layer diode 30 is in the closed or low impedance condition, the switching terminal leads 17, 17′, 17″ are now connected in circuit with the ungrounded or high potential side of the alternating power supply, and an operating current is supplied during this interval to the fluorescent lamps L, L′ and L″.

Let us assume that the variable resistor $R_2$ is set so that the five layer diode is fired at a delayed point in each half cycle. Taking an arbitrary positive half cycle of the alternating current supply, let us further assume that the polarity of the voltage across the supply lines 13, 14 will be such that line 13 is positive with respect to the other line 14 and the voltage is increasing in a positive direction. Since the five layer diode 30 is in its high impedance condition, a voltage is impressed across the phase control circuit 10 and a charging current is supplied to the capacitors $C_1$ and $C_2$. The time constant for the charging circuit is equal to the sum of the resistances of resistors $R_1$, $R_2$ multiplied by the sum of the capacitances of the capacitors $C_1$, $C_2$. When the voltage across capacitor $C_2$ and resistor $R_3$ reaches the switching voltage of the four layer diode 26, the diode is switched to its low impedance condition. At this instant the energy stored in the capacitor $C_1$ begins to be discharged through a path which includes diode $D_1$, the four layer diode 26, diode $D_4$, the primary winding $P_1$ and resistor $R_4$. The sudden discharge of the capacitor $C_1$ through the primary winding $P_1$ causes a voltage spike or pulse to be induced across the secondary winding $S_1$ thereby switching the five layer diode 30 to its low impedance condition. The conduction interval of the five layer diode 30 in each half cycle controls the volt-time integral of the voltage applied across the fluorescent lamps L, L′ and L″ thereby making it possible to operate the lamps at various illumination levels. As the conduction interval is reduced by changing the setting of the variable resistor $R_2$, the lamps L, L′, L″ are progressively dimmed.

During the negative half of each cycle it will be appreciated the charge on the capacitor $C_1$ is reversed but the polarity of the charge on the capacitor $C_2$ within the bridge rectifier 29 remains unchanged. Preferably, a greater portion of the timing capacitance is contributed by the capacitor $C_2$ connected within the bridge rectifier 29. By placing a greater portion of the timing capacitance within the bridge rectifier 29, it was found that it was possible to retain control of the power supplied to the lamps L, L′ and L″ at low dimming levels. If all of the timing capacitance is connected outside the bridge rectifier, control is lost if power to the system is interrupted while the dimming control is set at the low end of the dimming range.

The phase control circuit 10 shown in FIGURE 1 was constructed and employed to operate a fluorescent lamp load and a resistive load. The following specifications of the circuit components used are given by way of a specific exemplification of the invention actually reduced to practice and not by way of limitation thereof:

Resistor $R_1$ _____ 4,700 ohms, ½ watt.
Resistor $R_2$ _____ 75,000 ohms potentiometer.
Resistor $R_3$ _____ 470 ohms, ½ watt.
Resistor $R_4$ _____ 10 ohms, ½ watt.
Capacitor $C_1$ _____ 0.05 microfarad, 200 volts.
Capacitor $C_2$ _____ 0.1 microfarad, 200 volts.
Four layer diode 26 _____ Shockley 4E100-28.
Five layer diode 30 _____ 2 Hunt Electronic Co. five layer diodes connected in series.
Diodes $D_1$, $D_2$, $D_3$, $D_4$ ___ Mallory FW-200.
Transformer $T_1$ _____ Ferrite slug, ½ inch in diameter, 1 inch long.
Primary winding $P_1$ _____ 30 turns of .0142 inch in diameter wire.
Secondary winding $S_1$ ___ 120 turns of .032 inch in diameter wire.

In FIGURE 2 I have shown a schematic circuit diagram of the dimming ballast 9 corresponding to the ballast 9 shown in block form in the fluorescent lamp dimming system illustrated in FIGURE 1. The dashed rectangle 20 represents a ballast case or other enclosure for the components thereof. The dimming ballast 9 and other dimming ballasts which are particularly suitable for use in conjunction with the improved phase control circuit and dimming system of the invention are more fully described and claimed in application S.N. 104,107 filed in the name of the present applicant on April 19, 1960, and in application S.N. 199,734 filed in the name of Theodore R. Harpley on June 4, 1961, both of these applications being assigned to the assignee of the present invention.

The dimming ballast 9 includes a high reactance transformer $T_2$ comprised of a primary winding $P_2$ connected across the input terminals or leads 18, 19, a high leakage reactance secondary winding $S_2$, a closely coupled extension winding $S_3$, a winding $N_2$, a pair of filament heating windings $H_1$, $H_2$, a magnetic core 35 and magnetic shunts 36. The winding $N_2$ is connected in series with a capacitor $C_3$ and a resistor $R_5$ to provide an oscillatory voltage in the lamp operating circuit in order to insure reignition of the fluorescent lamp L at low power levels. A resistor $R_6$ is connected at one end to the extension winding $S_3$ and at the other end of the low reactance secondary $S_2$. This arrangement insures that current to the five layer diode 30 does not fall below the holding current value when the lamp is operated at low dimming levels. The capacitor $C_4$ serves as a power factor correcting means. The conductive plate 21, which usually is the lamp fixture, is positioned in proximity to the fluorescent lamp L so that it is capacitively coupled therewith and is connected to a ground $G_3$.

It will be noted that the low potential side of the primary winding $P_2$ (input lead 19 being adapted for connection to the low potential or grounded supply line 14) is connected to a ground $G_2$ through a resistor $R_7$ and the ballast case 20. Such a grounding arrangement serves as an auxiliary starting aid circuit and insures that in applications where the power distribution system is not effectively grounded, the voltage across the primary winding $P_2$ and the secondary winding $S_2$ is initially applied between a lamp filament and the grounded conductive plate to facilitate starting.

The extension winding $S_3$ is arranged so that the voltage induced in this winding is 180 degrees out of phase with and substantially equal in magnitude to the voltage induced across the high reactance secondary winding $S_2$. When the ballast 9 is connected with the phase control circuit 10 as shown in FIGURE 1 and the five layer diode 30 is in a high impedance condition, the voltage across the extension winding $S_3$ cancels the voltage induced across the high reactance secondary winding $S_2$. Thus, during the high impedance condition of the five layer diode 30, no voltage is applied across the fluorescent lamp L. When the five layer diode 30 is switched to its low impedance condition, the switching lead 17 is in effect joined in circuit with lead 18, and the voltage across the primary winding $P_2$ and the secondary winding $S_2$ is applied across the fluorescent lamp L. During this interval the resistor $R_6$ and the secondary winding $S_3$ insure that sufficient holding current flows through the five layer diode 30, particularly at low power levels.

Referring now to FIGURE 3, I have illustrated therein a modification of the phase control circuit shown in FIGURE 1 wherein the resistor $R_3$ and the capacitor $C_2$ connected within the bridge rectifier 29 have been omitted. In the phase control circuit 40 of FIGURE 3 the timing capacitance is provided entirely by the capacitor $C_1$ connected in series with the resistors $R_1$, $R_2$. Since the phase control circuits shown in FIGURES 1 and 3 are essentially similar, I have used the same reference numerals to identify the corresponding parts thereof.

When capacitor $C_1$ of the phase control circuit 40 shown in FIGURE 3 is charged to a level such that the voltage across the bridge rectifier 29 reaches the switching voltage of the four layer diode 26, the diode 26 is switched to the low impedance state. In the positive half cycle the capacitor $C_1$ discharges through diode $D_1$, the four layer diode 26, diode $D_4$, the primary winding $P_1$ and resistor $R_4$, thereby to excite the primary winding $P_1$ and induce a voltage spike or firing pulse in the secondary winding $S_1$ to fire the five layer diode 30. In the negative half cycle the capacitor $C_1$ discharges through resistor $R_4$, primary winding $P_1$ diode $D_2$, the four layer diode 26 and diode $D_3$. This discharge current causes the primary winding $P_1$ to be excited, and a voltage spike is induced in the secondary winding $S_1$ to trigger the five layer diode into conduction at a symmetrical point in the negative half cycle.

As compared with the phase control circuit shown in FIGURE 1, the phase control circuit 40 of FIGURE 3 possesses the advantage that it employs fewer components. As was previously mentioned, the phase control circuit 10 shown in FIGURE 1 possesses the advantage that phase control can be exercised at very low power levels. In the modified circuit shown in FIGURE 3 if line voltage is applied, when the potentiometer $R_2$ is set to provide a relatively late firing angle, the voltage across the capacitor $C_1$ may not be sufficient to fire the four layer diode.

Figure 4:
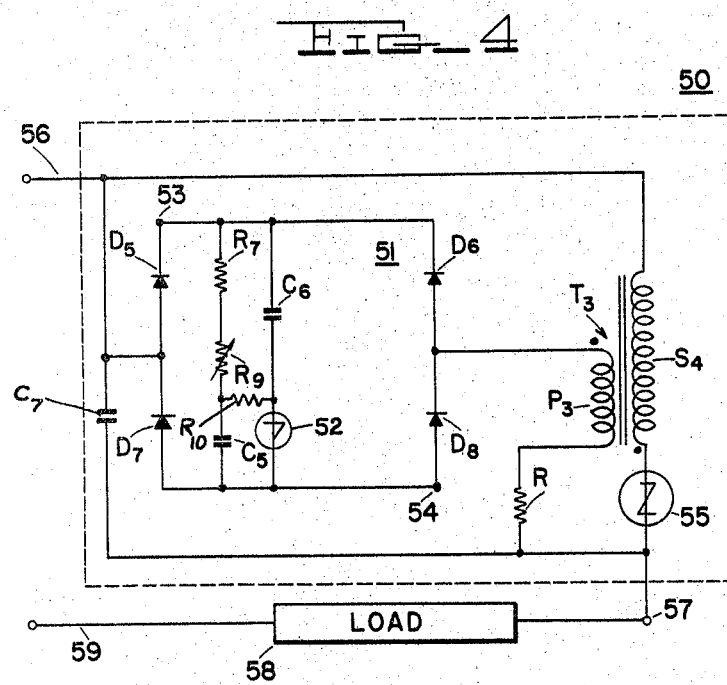
FIGURE 4 illustrates another embodiment of the invention wherein the RC timing circuit is connected within the bridge rectifier of the firing network.

In FIGURE 4 I have illustrated a modification of the phase control circuit of the invention in which the RC circuit is placed entirely within a bridge rectifier 51 comprised of the diodes $D_5$, $D_6$, $D_7$, $D_8$. As is shown in FIGURE 4, the resistors $R_8$, $R_9$ of the RC timing circuit are connected in series with a capacitor $C_5$. The RC circuit controls the firing point of the four layer diode 52 in shunt with the resistors $R_8$, $R_9$ to pass the excitation pulse for a transformer $T_3$. A capacitor $C_7$ is connected across the terminals 56 and 57 to provide a low impedance energy source for the trigger pulse. A resistor $R_9$ is connected in series with four layer diode 52 to limit the discharge current of capacitor $C_5$. A resistor $R_{10}$ is connected in series with the primary winding $P_3$ of transformer $T_3$ to limit the amplitude of the current pulse through capacitor $C_6$. As in the other phase control circuits, a five layer diode 55 is coupled with the secondary winding $S_4$.

Input terminal or lead 56 is provided for connection to the ungrounded or high potential supply line of the alternating power supply. As is shown in FIGURE 4, the switching line 57 is connected in circuit to one side of a load 58. The other side of the load 58 is provided with a lead 59 for connection to the grounded or low potential line of the power supply.

During operation the four layer diode 52 and the bridge rectifier 51 function as a symmetrical switch for triggering the five layer diode 55, which serves as the power control device. When the voltage across capacitor $C_5$ exceeds the breakdown voltage of four layer diode 52, the four layer diode 52 switches to its low impedance condition. At this instant the voltage across the bridge rectifier drops abruptly to the voltage level that prevails across capacitor $C_6$, and a charging current pulse from capacitor $C_7$ is initiated which flows from capacitor $C_7$ through diode $D_5$, through capacitor $C_6$, four layer diode 52, diode $D_8$, primary winding $P_3$, resistor $R_{10}$ and back to $C_7$, thereby inducing a voltage in secondary winding $S_4$ which switches the five layer diode 55 to its low impedance state. The variable resistor $R_9$ controls the firing angle of the four layer diode 52 and thereby controls the instantaneous power supplied to the load 58 in each half cycle of the alternating supply.

In FIGURE 5 I have shown a schematic circuit diagram of a phase control circuit 60 embodying another form of the invention wherein a firing network utilizing a four layer diode 61 connected within a bridge rectifier 62 is directly coupled across a five layer diode 63. The five layer diode 63 is connected as a power control device between terminal 64, which is adapted for connection to one side of an alternating current power supply, and terminal 65 which is shown connected to one end of a load 66. The other end of the load 66 is connected to a terminal or lead 67 adapted for connection to the other side of the alternating current supply. The load 66 may be a plurality of dimming ballasts connected as shown in FIGURE 1 or may be any other load where it is desirable to provide a symmetrical control of the instantaneous power supplied to the load.

The firing network is connected across the five layer diode 63 so that the network is energized only when the five layer diode 63 is in the high impedance or open condition. When the five layer diode 63 is switched to the high impedance condition, capacitor $C_8$ is charged through resistors $R_{12}$ and $R_{13}$. Resistors $R_{12}$ and $R_{13}$ connected in series circuit with capacitor $C_8$ have a sufficiently low resistance so that the capacitor $C_8$ rapidly charges essentially to the line voltage. The resistor $R_{12}$ is provided to limit the discharge current of capacitor $C_9$ flowing through the four layer diode 61 and the five layer diode 63. Resistor $R_{14}$ and variable resistor $R_{15}$ control the charging rate of a capacitor $C_9$. The connection 68 joining the capacitor $C_9$ in circuit with the resistor $R_{15}$ and the connection 69 joining the resistor $R_{13}$ and capacitor $C_8$ are connected to the A.C. terminals 70, 71 of a bridge rectifier 62 comprised of diodes $D_9$, $D_{10}$, $D_{11}$ and $D_{12}$. The four layer diode 61 is connected within the bridge rectifier 62 in circuit with the D.C. terminals 72, 73.

Operation of the phase control circuit 60 is initiated by connecting the input terminals 64, 67 across a suitable alternating current supply. Let us now consider an arbitrary positive half cycle of the alternating current supply. At the start of the positive half cycle the five layer diode 63 will be in the high impedance condition, and the capacitors $C_8$ and $C_9$ will be charged. At a point in the half cycle as determined by the setting of the variable resistor $R_{15}$, the charge on the capacitor $C_9$ will attain a magnitude such that the voltage across the bridge rectifier 62 reaches the switching voltage of the four layer diode 61. The four layer diode 61 now conducts, and the capacitor $C_9$ discharges through diode $D_9$, the four layer diode 61, diode $D_{12}$ and through the resistor $R_{13}$ to provide a voltage across the resistor $R_{13}$ that is in additive relation to the voltage across the capacitor $C_8$. Accordingly, the voltage across the five layer diode 63 is increased to a point where its switching voltage is exceeded, and it is switched to the low impedance condition.

During the low impedance condition of the five layer diode 63, power is supplied to the load 66 from the alternating supply, and the firing network is shunted. At the end of the half cycle the five layer diode 63 returns to its high impedance condition, and the firing network is again energized to commence the succeeding or negative half cycle.

In the negative half cycle, the capacitor $C_9$ is charged with a voltage of opposite polarity, and at a symmetrical point in the half cycle capacitor $C_9$ is discharged through the resistor $R_{13}$ to augment the voltage across capacitor $C_8$ and cause the five layer power device 63 to be switched to a low impedance condition. During the remainder of the negative half cycle, power is supplied to the load 66 from the alternating supply. In this manner the power supplied to the load 66 is symmetrically controlled in each half cycle of the alternating supply.

From the foregoing description of the various embodiments of the invention, it will be apparent that an improved phase control circuit has been provided that employs relatively inexpensive components. It will be appreciated that the diodes used in the bridge rectifier arrangement do not carry the load current as is the case where a controlled rectifier is used in a bridge as a bilateral switch. A principal advantage of the improved arrangement is that a very high degree of symmetry in the firing angle of a five layer diode can be readily achieved with commercially available components.

While I have described and illustrated particular embodiments of my invention, it will be apparent to those skilled in the art that changes and modifications may be made. It is intended therefore in the appended claims to cover all changes and modifications as fall within the true spirit and scope of my invention.

What I claim as new and desire to secure by Letters Patent of the United States is:

1. A system for operating and dimming electric discharge lamps comprising: at least one dimming ballast for providing the starting and operating voltages for an electric discharge lamp, said dimming ballast having input leads for connection to an alternating current supply and having a switching lead, a five layer diode operable bilaterally in a high impedance and a low impedance condition and connected in series circuit with one of the input leads of the dimming ballast and the switching lead to control the volt-time integral of the voltage supplied to the electric discharge lamps, a switching network including a transformer having a primary winding connected to said network and having a secondary winding, said secondary winding being connected in series circuit relation with said five layer diode, said switching network including a bridge rectifier having A.C. terminals and D.C. terminals, a four layer diode connected across said D.C. terminals, an RC timing circuit coupled with said four layer diode to fire said four layer diode at a predetermined point in each half cycle to cause a voltage spike to be induced in the secondary winding of the transformer and thereby symmetrically switch said five layer diode to a low impedance condition in each half cycle, said switching network being connected across said five layer diode and being energized only when said five layer diode is in the high impedance condition, and circuit means connecting said five layer diode in circuit with said switching lead of said dimming ballast to thereby cause a voltage to be applied across the electric discharge lamp when the five layer diode is switched to the low impedance condition and to interrupt the voltage when the five layer diode is switched to the high impedance condition.

2. A system for dimming fluorescent lamps comprising: a plurality of fluorescent lamps, a plurality of dimming ballasts operatively connected with said lamps for supplying the starting and operating potential to said lamps, each of said ballasts having a switching lead; a phase control means including five layer diode operable between a low impedance and high impedance condition and a firing network comprised of a transformer having a primary winding connected to said network and having a secondary winding, said secondary winding being connected in series circuit with said five layer diode, a bridge rectifier having A.C. and D.C. terminals, a four layer diode connected across the D.C. terminals of the bridge rectifier and an RC timing circuit connected in circuit with the four layer diode to control the switching point of said four layer diode, said four layer diode being fired at symmetrical points in each half cycle and causing a voltage spike to be induced in the secondary winding thereby firing said five layer diode symmetrically in each half cycle; and circuit means connecting said secondary winding and said five layer diode in series circuit with said switching leads to cause a voltage to be applied across the fluorescent lamps when the five layer diode is switched to the low impedance condition and to interrupt the voltage when the five layer diode is switched to the high impedance condition.

3. A phase control circuit for use in conjunction with dimming ballasts having connections for switchably controlling the volt-time interval of the voltage supplied to electric discharge lamps, said circuit comprising: a five layer diode operable bilaterally in a high impedance and a low impedance condition, a firing network connected across said five layer diode, said firing network including a variable resistor means, a capacitor connected in series with said variable resistor means, a bridge rectifier having A.C. and D.C. terminals, one of said A.C. terminals connected to said variable resistor means, said capacitor being charged through said variable resistor and forming an RC timing circuit connected to a pair of said terminals, a four layer diode connected across said D.C. terminals and being controllably fired at a symmetrical point in each half cycle, and means coupling said firing network to said five layer diode to supply a voltage spike to said five layer diode when said four layer diode is fired to thereby symmetrically fire said five layer diode in each half cycle.

4. A phase control circuit for symmetrically controlling the power supplied to a load in each half cycle, said phase control circuit comprising: a five layer diode switchable bilaterally from a low impedance condition to a high impedance condition, a transformer having a primary winding and a secondary winding, said secondary winding being connected in series with said five layer diode, a four layer diode switchable unilaterally from a high impedance to a low impedance condition, a bridge rectifier having A.C. and D.C. terminals, said four layer diode being connected across the D.C. terminals of said bridge rectifier, an RC circuit comprised of a serially connected variable resistor and capacitor connected across said five layer diode and secondary winding, one of the A.C. terminals of said bridge rectifier being connected in circuit with said RC circuit and the other of said A.C. terminals being connected in circuit with the primary winding of said transformer to place said bridge rectifier and primary winding in parallel circuit relation with said capacitor, said RC circuit controllably determining the point in each half cycle when said four layer diode is switched to the low impedance condition to cause a voltage pulse to be induced in the secondary winding of said transformer thereby to trigger the five layer diode into the low impedance condition symmetrically in each half cycle.

5. A phase control circuit for symmetrically controlling the power supplied to a load in each half cycle of an alternating power supply, said phase control circuit comprising: a first semiconductor device switchable bilaterally from a low impedance to a high impedance condition, an RC timing circuit including a variable resistor means and at least one capacitor connected in series circuit relation therewith, said RC circuit being connected across said first semiconductor device, a bridge rectifier having A.C. and D.C. terminals, a second semiconductor device switchable unilaterally from a low impedance to a high impedance condition and connected across said D.C. terminals, and a transformer having a primary winding and a secondary winding, said secondary winding being connected in series circuit with said first semiconductor device, said primary winding of said transformer being connected in circuit across the capacitor of said RC timing circuit, and said second semiconductor device being fired at symmetrical points in each half cycle and causing a voltage pulse to be induced in the secondary winding of the transformer thereby to fire said first semiconductor switching device symmetrically in each half cycle of the alternating power supply.

6. A phase control circuit for symmetrically controlling the power supplied to a load in each half cycle, said phase control circuit comprising: a first semiconductor device switchable bilaterally from a low impedance condition to a high impedance condition, a transformer having a primary winding and a secondary winding, said secondary winding being connected in series circuit with said first semiconductor switching device, a rectifying means having A.C. and D.C. terminals, a second semiconductor device switchable unilaterally from a low impedance condition to a high impedance condition and connected across the D.C. terminals of said rectifying means, a variable resistor means and a first capacitor connected across said secondary winding and said first semiconductor device, and a second capacitor connected across the D.C. terminals of said rectifying means, said first and second capacitors being charged through said variable resistor means to control the firing angle of said second semiconductor device in each half cycle, said primary winding of said transformer and said rectifying means being serially connected across said first capacitor, and said second semiconductor device when fired causing a voltage pulse to be induced in the secondary winding of said transformer to thereby symmetrically fire said first semiconductor device in each half cycle.

7. A phase control circuit for symmetrically controlling the power supplied to a load in each half cycle, said phase control circuit comprising: a first semiconductor device switchable bilaterally between a low impedance and a high impedance condition, a transformer having a primary winding and a secondary winding, said secondary winding being connected in series circuit with said first semiconductor device, a rectifying means having A.C. and D.C. terminals, said rectifying means and said primary winding of said transformer being connected in circuit across said first semiconductor device and said secondary winding, a variable resistor means and a first capacitor connected in series circuit relation, said serially connected variable resistor means and said first capacitor being connected across the D.C. terminals of said rectifying means, a second semiconductor device switchable unilaterally between a low impedance condition and a high impedance condition, a fixed resistor serially connected with said second semiconductor device, said serially connected fixed resistor and said second semiconductor device being connected across said first capacitor, a second capacitor connected in parallel circuit relation with said variable resistor means and said fixed resistor, said variable resistor means and said first capacitor controllably determining the point in each half cycle when said second semiconductor device is switched to the low impedance condition, said second semiconductor device when switched to the low impedance condition causing said second capacitor to be charged through the primary winding of said transformer to cause a voltage pulse to be induced in the secondary winding thereof and to symmetrically fire said first semiconductor device in each half cycle.

8. A phase control circuit for symmetrically controlling the power supplied to a load in each half cycle of an alternating current supply, said phase control circuit comprising: a first semiconductor device switchable bilaterally between a low impedance and a high impedance condition, a transformer means having a primary winding and a secondary winding, said secondary winding being connected in series circuit with said first semiconductor device, a variable resistor means, a capacitor connected in series circuit relation with said variable resistor means, said serially connected variable resistor means and capacitor being connected across said secondary winding and said first semiconductor device, a bridge rectifier, and a second semiconductor device switchable unilaterally between a low impedance and a high impedance condition, said second semiconductor device connected within said bridge rectifier, said bridge rectifier and the primary winding of said transformer means connected in circuit across said first semiconductor device, and said second semiconductor device being fired at a predetermined point in each half cycle to cause a firing pulse to be induced across the secondary winding to trigger said first semiconductor switching device into a low impedance condition symmetrically in each half cycle.

9. In a phase control circuit for symmetrically controlling the power supplied to a load in each half cycle, a five layer diode switchable bilaterally between a low impedance condition and a high impedance condition, a transformer means having a primary winding and a secondary winding, said secondary winding being connected in series circuit with said five layer diode, a variable resistor means and a first capacitor connected in series circuit relation, said serially connected variable resistor means and first capacitor being connected in circuit across said five layer diode and said secondary winding, a bridge rectifier connected in series circuit relation with said primary winding across said first capacitor, a four layer diode connected within said bridge rectifier, a second capacitor connected within said bridge rectifier, said first and second capacitors being charged through said variable resistor means to control the firing angle of said four layer diode, and said four layer diode when switched to a low impedance condition in each half cycle causing said first capacitor to discharge through said primary winding to cause a firing pulse to be induced in the secondary winding to thereby fire said five layer diode symmetrically in each half cycle of the alternating current supply.

10. In a phase control circuit for symmetrically controlling power supplied to a load in each half cycle of the alternating current supply, a first semiconductor device switchable bilaterally between a low impedance condition and a high impedance condition in response to the terminal voltage, a transformer having a primary and a secondary, said secondary being connected in series circuit with said first semiconductor device, a variable resistor means and a first capacitor connected in series circuit relation, said serially connected variable resistor means and said first capacitor being connected across said first semiconductor device and said secondary, a bridge rectifier, a first resistor, said bridge rectifier being connected in series circuit relation with the primary of said transformer and said first resistor, said serially connected bridge rectifier, primary and first resistor being connected across said first capacitor, a second semiconductor device switchable unilaterally between a low impedance and a high impedance condition and connected within said bridge rectifier, a second resistor and a second capacitor connected in series circuit therewith, said serially connected second resistor and second capacitor being connected across said second semiconductor device, said first and second capacitors being charged through said variable resistor means to a predetermined voltage level to fire said second semiconductor device symmetrically in each half cycle to cause a firing pulse to be induced across the secondary of said transformer to switch said first semiconductor device symmetrically to a low impedance condition in each half cycle.

11. A phase control circuit for symmetrically controlling the power supplied to a load in each half cycle, said phase control circuit comprising: a first semiconductor device operable bilaterally between a high impedance and a low imepdance condition, a firing network connected in circuit with said first semiconductor device to trigger said first semiconductor device to said low impedance condition, said firing network including a variable resistor means, a first capacitor connected in series with said variable resistor means, a bridge rectifier, a second semiconductor device connected within said bridge rectifier and operable unilaterally between a high impedance and a low impedance condition in response to the terminal voltage across said device, said second semiconductor device being controllably fired in each half cycle as determined by the time constant of said variable resistor means and at least said first capacitor, a second capacitor connected in circuit with said bridge rectifier, and an impedance element connected in circuit with said second capacitor within said switching network, said second semiconductor device when switched to the low impedance condition causing said first capacitor to discharge through said impedance element to augment the voltage across said second capacitor and thereby switch said first semiconductor device to its low impedance condition in each half cycle to symmetrically control the power supplied to the load.

12. A phase control circuit for controlling the power supplied from an alternating supply to a load in each half cycle, said phase control circuit comprising: a five layer diode switchable bilaterally from a low impedance condition to a high impedance condition, circuit means connecting said five layer diode in circuit with a load across the alternating power supply, a variable resistor means, a first capacitor, a first connection means joining said variable resistor means and said first capacitor in series circuit relation, a second capacitor, an impedance element, a second connection means connecting said impedance element in series circuit with said second capacitor, circuit means connecting said second capacitor and said impedance element in circuit across said five layer diode and connecting said first capacitor and variable resistor means in circuit across said serially connected second capacitor and impedance element, and a bridge rectifier having A.C. and D.C. terminals, and a four layer diode connected within said bridge rectifier in circuit with said D.C. terminals of said bridge rectifier, one of said A.C. terminals being connected in circuit with said first connection means and the other of said D.C. terminals being connected in circuit with said second connection means, said four layer diode being controllably switched to a low impedance condition in each half cycle to cause said first capacitor to discharge to thereby cause the voltage across the five layer diode to exceed the switching voltage thereof and symmetrically fire the five layer diode in each half cycle of the alternating current supply.

13. A phase control circuit for symmetrically controlling the power supply to a load in each half cycle, said phase control circuit comprising: a first semiconductor device operable bilaterally between a high impedance and a low impedance condition, a firing network connected in circuit across said first semiconductor device to trigger said device to the low impedance condition, a variable resistor means, a first capacitor connected in series with said variable resistor means, a full wave rectifier, a second semiconductor device connected within said full wave rectifier and operable unilaterally between a high impedance and a low impedance condition, said second semiconductor device being poled so that a forward bias is applied across said semiconductor device in each half cycle of the alternating current source, circuit means connecting said variable resistor means and said first capacitor in circuit with said full wave rectifier so that said second semiconductor device is controllably fired in each half cycle as determined by the time constant of said variable resistor means and said first capacitor, a second capacitor connected in circuit with said full wave rectifier, and an impedance element connected in circuit with said second capacitor across said first semiconductor device, said second semiconductor device when switched to the low impedance condition causing said first capacitor to discharge through said impedance element to augment the voltage across said second capacitor thereby to switch said first semiconductor device to its low impedance condition in each half cycle and symmetrically control the power supplied to the load.

References Cited by the Examiner
UNITED STATES PATENTS
3,159,766  12/1964  Harpley _____ 315—195

GEORGE N. WESTBY, *Primary Examiner.*

S. D. SCHLOSSER, *Assistant Examiner.*